United States Patent
Kifuku et al.

(10) Patent No.: US 7,852,023 B2
(45) Date of Patent: Dec. 14, 2010

(54) ELECTRIC POWER STEERING CONTROLLER

(75) Inventors: Takayuki Kifuku, Tokyo (JP); Kazuto Kusakabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/181,772

(22) Filed: Jul. 15, 2005

(65) Prior Publication Data

US 2006/0049788 A1    Mar. 9, 2006

(30) Foreign Application Priority Data

Sep. 7, 2004    (JP) .............................. 2004-259446

(51) Int. Cl.
    *H02P 3/00*    (2006.01)
(52) U.S. Cl. ...................... 318/139; 318/432; 180/280; 180/443
(58) Field of Classification Search ......... 318/432–434, 318/66, 806, 103, 139, 265, 277, 563, 689; 180/65.1–65.8, 443, 54.1, 280, 400; 324/552
    See application file for complete search history.

(56) References Cited

U.S. PATENT DOCUMENTS

| | | | | |
|---|---|---|---|---|
| 4,660,671 A * | 4/1987 | Behr et al. | ................... | 180/446 |
| 4,765,426 A | 8/1988 | Shimizu | | |
| 4,771,843 A | 9/1988 | Shimizu | | |
| 4,940,102 A * | 7/1990 | Morishita | .................... | 180/446 |
| 4,943,758 A * | 7/1990 | Tsurumiya | .................... | 318/504 |
| 5,027,276 A * | 6/1991 | Morishita et al. | .............. | 701/43 |
| 5,072,354 A * | 12/1991 | Katto et al. | .................... | 363/41 |
| 5,202,830 A * | 4/1993 | Tsurumiya et al. | ............ | 701/41 |
| 5,331,258 A * | 7/1994 | Lankin et al. | ............... | 318/139 |
| 5,552,684 A * | 9/1996 | Wada et al. | .................. | 318/293 |
| 5,635,804 A * | 6/1997 | Tanaka et al. | ............... | 318/139 |
| 5,732,790 A * | 3/1998 | Endo et al. | .................. | 180/444 |
| 5,861,725 A * | 1/1999 | Endo et al. | .................. | 318/434 |
| 5,912,539 A * | 6/1999 | Sugitani et al. | ............. | 318/434 |
| 5,920,174 A * | 7/1999 | Kawada et al. | .............. | 318/663 |
| 6,008,600 A * | 12/1999 | Tomioka | ................. | 318/400.28 |
| 6,240,350 B1 * | 5/2001 | Endo | ........................... | 701/41 |
| 6,268,708 B1 * | 7/2001 | Kawada et al. | .............. | 318/430 |
| 6,332,506 B1 * | 12/2001 | Kifuku | ....................... | 180/443 |
| 6,439,336 B2 | 8/2002 | Noro et al. | | |
| 6,448,738 B1 * | 9/2002 | Burton et al. | ............... | 318/807 |

(Continued)

FOREIGN PATENT DOCUMENTS

DE    4003103 A1    8/1990

(Continued)

*Primary Examiner*—Bentsu Ro
*Assistant Examiner*—Antony M Paul
(74) *Attorney, Agent, or Firm*—Sughrue Mion, PLLC

(57) ABSTRACT

The object of the present invention is to provide an electric power steering controller in which a redundant system equal to that with a relay is configured, without incurring the upsizing or deterioration in reliability, of the controller. An electric power steering controller involving the present invention is provided with a motor for providing a steering system with output torque; a motor driving circuit for driving the motor; a microcontroller for calculating a current to be applied to the motor; a gate driver for driving a plurality of switching devices constituting a bridge circuit, based on the result of the calculation by the microcontroller; and a switching portion for cutting off the power supply to the gate driver.

4 Claims, 2 Drawing Sheets

U.S. PATENT DOCUMENTS

| | | |
|---|---|---|
| 6,687,590 B2 * | 2/2004 | Kifuku et al. .................. 701/43 |
| 6,808,043 B2 * | 10/2004 | Kawada et al. .............. 180/446 |
| 6,816,765 B2 * | 11/2004 | Yamamoto et al. ............ 701/41 |
| 6,837,331 B2 * | 1/2005 | Kawada et al. .............. 180/446 |
| 6,877,584 B2 * | 4/2005 | Jonokuchi et al. ........... 180/446 |
| 6,907,334 B2 * | 6/2005 | Yoshida et al. ................. 701/41 |
| 6,995,567 B2 * | 2/2006 | Kawashima et al. ........ 324/522 |
| 7,157,874 B2 * | 1/2007 | Nomura et al. ............. 318/432 |
| 2004/0007416 A1 * | 1/2004 | Furumi et al. ................ 180/443 |
| 2004/0222035 A1 * | 11/2004 | Yoneda et al. .............. 180/443 |

FOREIGN PATENT DOCUMENTS

| | | |
|---|---|---|
| DE | 10117058 B4 | 5/2006 |
| JP | 02-212269 | 8/1990 |
| JP | 7-96387 B2 | 10/1995 |
| JP | 10-167085 * | 6/1998 |

* cited by examiner

ELECTRIC POWER STEERING CONTROLLER

BACKGROUND OF THE INVENTION

1. Field of the Invention

The present invention relates to an electric-power steering controller, and more particularly to cutting off power supply when failure occurs.

2. Description of the Related Art

In FIG. 2, the circuit configuration of a conventional electric power steering controller is illustrated. In such an electric power steering controller, a motor M is adapted to provide an unillustrated steering system with assist torque. In order to control an electric power steering, a microcontroller (hereinafter referred to as MCU) 1, using a motor-current target value calculated based on output from an unillustrated torque sensor, a vehicle speed sensor, or the like, and using a motor-current detected value detected through a shunt resistor 2, acquires a target voltage to be applied and outputs to a gate driver 3 a controlling signal corresponding to the target voltage to be applied. The gate driver 3 controls the rotating direction and the output torque of the motor M by switching on and off, by means of a driving signal based on the controlling signal, each of switching devices constituting a bridge circuit 4, and by controlling a voltage to be applied to the motor M.

In such a conventional electric power steering controller, if MCU 1 has determined that any failure exists in the electric power steering controller, MCU 1 stops driving the motor by cutting off a power supply relay 6 provided between the bridge circuit 4 and a battery 5, or a motor relay 7 provided between the bridge circuit 4 and the motor M (refer to Japanese Laid-Open Patent Publication (Examined) 1995-96387). Because the methods for detecting the failure are commonly known, the description for those will be omitted.

However, in the controller as described above, it is necessary to insert the power supply relay 6 provided between the bridge circuit 4 and the battery 5, or the relay provided between the bridge circuit 4 and the motor M. During normal conditions, the relay has to let an electric-motor current flow; because a current of several tens of amperes flows in the case of an electric power steering apparatus, a sizable relay with a large current capacity is needed to be employed, resulting in an obstacle to downsizing the controller.

In addition, when disposed on a board or the like, a relatively sizable relay has its center of gravity far from (high off of) the mounting surface, whereby it is susceptible to various vibrations (engine vibration or vibration in driving) of vehicles equipped with an electric power steering apparatus therein; therefore, the connecting portions on the relay are liable to snap, and its contacts are liable to weld, resulting in an obstacle to the reliability hike of the controller.

The present invention addresses the foregoing problems, and its object is to provide an electric power steering controller in which a redundant system equal to that with a relay is configured, without incurring the upsizing, or deterioration in reliability, of the controller.

SUMMARY OF THE INVENTION

An electric power steering controller involving the present invention is provided with a motor for providing a steering system with output torque; a motor driving circuit for driving the motor; a microcontroller for calculating a current to be applied to the motor; a gate driver for driving a plurality of switching devices constituting a bridge circuit, based on the result of the calculation by the microcontroller; and a switching portion for cutting off the power supply to the gate driver.

According to an electric power steering controller of the present invention, an electric power steering controller can be provided in which a redundant system equal to that with a relay is configured, without incurring the upsizing, or deterioration in reliability, of the controller.

DETAILED DESCRIPTION OF THE PREFERRED EMBODIMENTS

For the sake of detailed explanation, the present invention will be discussed in detail referring to the accompanying drawings.

Embodiment 1

Figure 1:
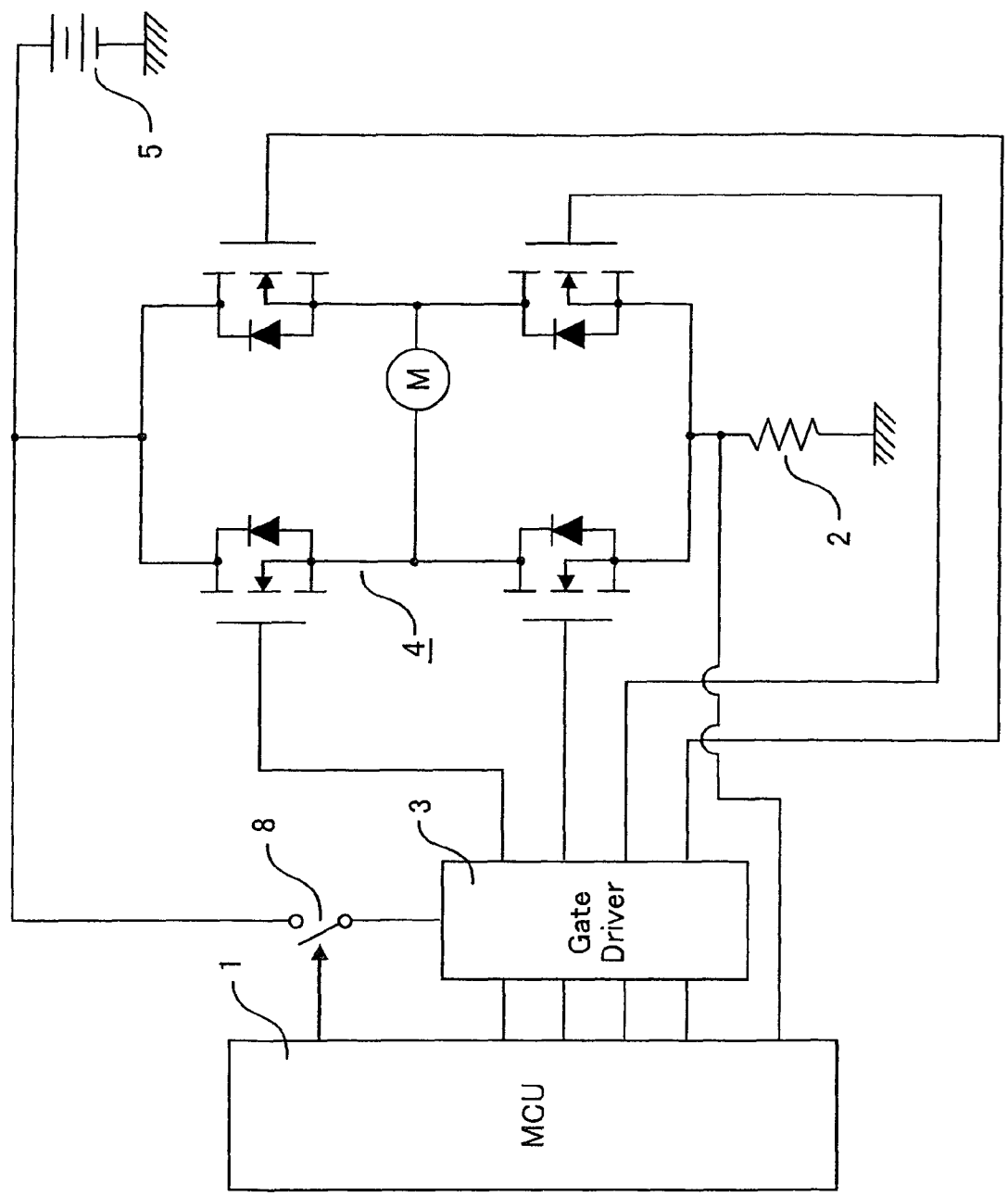
FIG. 1 is a circuit diagram illustrating the configuration of an electric power steering controller involving Embodiment 1 of the present invention.
Figure 2:
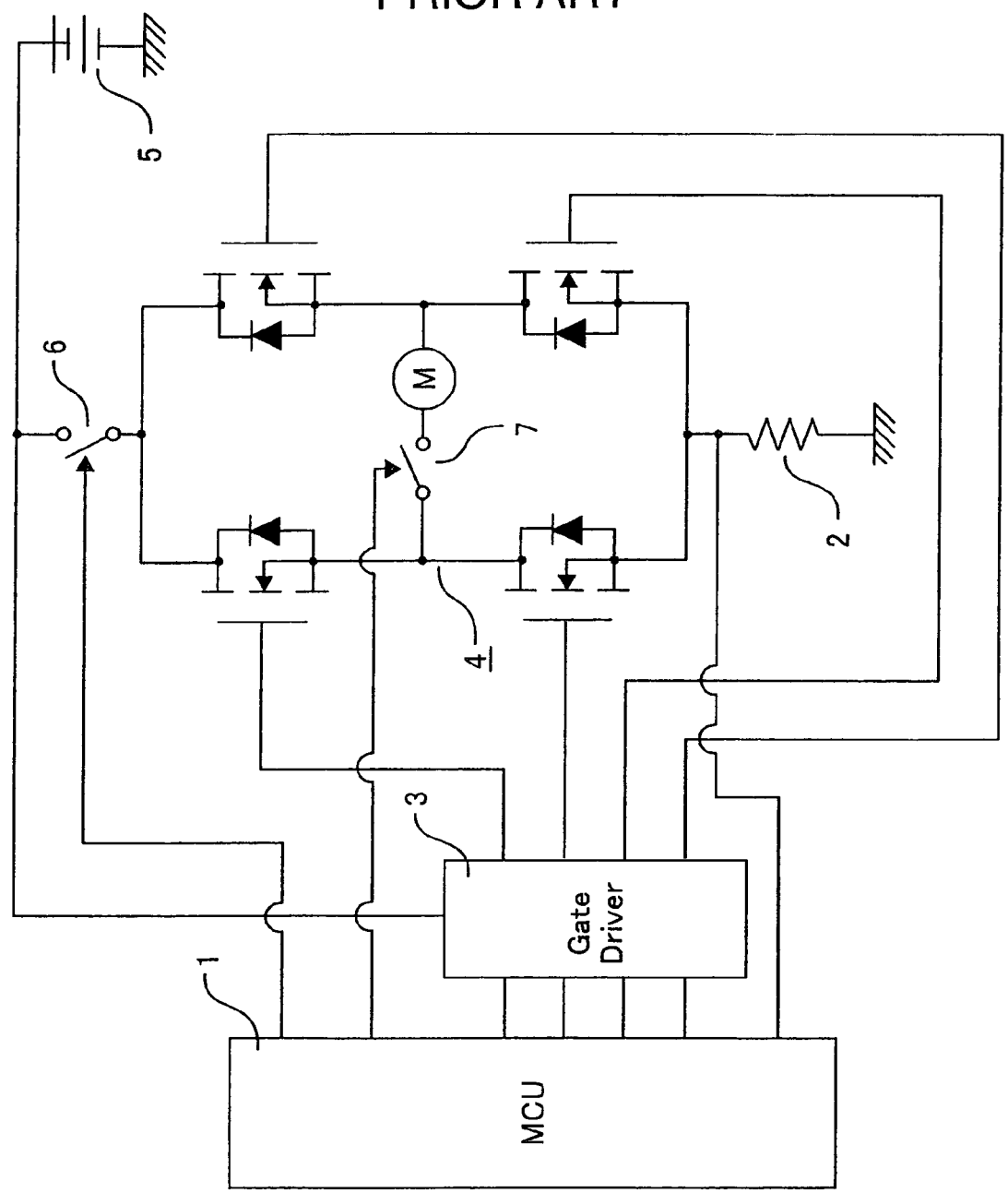
FIG. 2 is a circuit diagram illustrating the configuration of a conventional electric power steering controller.

FIG. 1 is a circuit diagram illustrating the configuration of an electric power steering controller involving the present invention. In FIG. 1, a motor M is adapted to provide an unillustrated steering system with assist torque. In order to control an electric power steering system, using a motor-current target value calculated based on output from an unillustrated torque sensor, a vehicle speed sensor, or the like, and using a motor-current detected value detected through a shunt resistor 2, MCU 1 acquires a target voltage to be applied and outputs to a gate driver 3 a controlling signal corresponding to the target voltage to be applied. The gate driver 3 controls the rotating direction and the output torque of the motor M by switching on and off, by means of a driving signal based on the controlling signal, each of switching devices constituting a bridge circuit 4, and by controlling a voltage to be applied to the motor M.

The electric power steering controller involving the present invention is further provided, between the gate driver 3 and a battery 5, with a relay 8 as a switching portion for cutting off the power supply to the gate driver 3.

If MCU 1 has determined that any failure exists in the electric power steering controller, the relay 8 is turned off by means of a signal from MCU 1, whereupon the power supply to the gate driver 3 is cut off. As a result, driving signals that originate in the gate driver 3 and are forwarded to the bridge circuit 4 are ceased, whereby a fail-safe, i.e., a measure for stopping the motor M is taken.

In this situation, the current necessary to operate the gate driver 3 is on the order of 100 mA, which is very small compared with that (several tens of amperes) necessary to drive the motor M. Therefore, a small-size relay, which has a current capacity smaller than that of a power supply relay or a motor relay that was provided in a conventional electric power steering controller, can be utilized, whereby downsizing the controller can be achieved while a redundant system equivalent to a conventional one is constituted.

In the forgoing Embodiment 1, the relay 8 is used as a switching portion for cutting off the power supply for the gate driver 3; however, a semiconductor switching device (e.g., a field effect transistor) may be employed in place of the relay 8. Employing a semiconductor switching device situates the center of gravity of the device mounted on a circuit board close to (low from) the mounting surface, thereby enhancing vibration resistance, and eliminates the possible welding of the contacts, thereby enhancing the reliability of the controller.

In the foregoing Embodiment 1, a DC motor is utilized as the motor M, and a so-called H-bridge is used as the bridge circuit; however, it goes without saying that the same effects can be demonstrated, even if a multi-phase motor, such as a three-phase synchronous motor, a three-phase induction motor, or a DC brushless motor, is used, and even if a three-phase bridge circuit is employed as the bridge circuit.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within the metes and bounds of the claims, or the equivalence of such metes and bounds, are therefore intended to be embraced by the claims.

What is claimed is:

1. An electric power steering controller comprising:
    a motor for providing a steering system with output torque;
    a motor driving circuit connected to a battery, for driving the motor, said motor driving circuit including switching units respectively controllable by gates;
    a microcontroller for generating a control signal to be applied to the motor;
    a gate driver connected to the gates of said motor driving circuit, for driving said motor driving circuit based on the control signal from said microcontroller; and
    a switching portion, connected to said gate driver and a connection path connecting said battery to said motor driving circuit, for cutting off power supply to said gate driver, in response to the control signal from the microcontroller, while power supply to said motor driving circuit is maintained through connection of said motor driving circuit to said battery.

2. An electric power steering controller according to claim 1, wherein said switching portion cuts off power supply to said gate driver when said microcontroller has determined that any failure exists in the electric power steering controller.

3. An electric power steering controller according to claim 1, wherein said switching portion is a semiconductor switching device.

4. An electric power steering controller comprising:
    a motor for providing a steering system with output torque;
    a motor driving circuit connected to a battery, for driving the motor, said motor driving circuit including switching units respectively controllable by gates;
    a microcontroller for generating a control signal to be applied to the motor;
    a gate driver connected to the gates of said motor driving circuit, for driving said motor driving circuit based on the control signal from said microcontroller; and
    a switching portion, connected to said gate driver and a connection path connecting said battery to said motor driving circuit, for cutting off power supply to said gate driver, in response to the control signal from the microcontroller, while power supply to said motor driving circuit is maintained through connection of said motor driving circuit to said battery,
    wherein the connection between said motor driving circuit and said battery does not contain a relay capable of cutting off power supply to said motor driving circuit.

* * * * *